US012506378B2

(12) United States Patent
Morino et al.

(10) Patent No.: US 12,506,378 B2
(45) Date of Patent: Dec. 23, 2025

(54) MULTI-PHASE MOTOR INSULATING STRUCTURE AND MULTI-PHASE MOTOR

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Shintaro Morino, Osaka (JP); Kanzo Ishihara, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 238 days.

(21) Appl. No.: 18/558,610

(22) PCT Filed: Apr. 28, 2022

(86) PCT No.: PCT/JP2022/019378
§ 371 (c)(1),
(2) Date: Nov. 2, 2023

(87) PCT Pub. No.: WO2022/234825
PCT Pub. Date: Nov. 10, 2022

(65) Prior Publication Data
US 2024/0243634 A1 Jul. 18, 2024

(30) Foreign Application Priority Data
May 7, 2021 (JP) .................. 2021-078882

(51) Int. Cl.
*H02K 3/50* (2006.01)
*H02K 3/38* (2006.01)
*H02K 5/22* (2006.01)

(52) U.S. Cl.
CPC ............... *H02K 3/50* (2013.01); *H02K 3/38* (2013.01); *H02K 5/225* (2013.01); *H02K 2203/09* (2013.01)

(58) Field of Classification Search
CPC ............ H02K 5/225; H02K 3/50; H02K 3/38
(Continued)

(56) References Cited
U.S. PATENT DOCUMENTS
2003/0127935 A1* 7/2003 Mori .................... H02K 15/30
310/206

FOREIGN PATENT DOCUMENTS
JP 2000-209802 A 7/2000
JP 2003-134758 A 5/2003
(Continued)

OTHER PUBLICATIONS

International Search Report, Application No. PCT/JP2022/019378, mailed Jun. 28, 2022. ISA/Japan Patent Office.

*Primary Examiner* — Terrance L Kenerly
*Assistant Examiner* — Theodore L Perkins
(74) *Attorney, Agent, or Firm* — Honigman LLP

(57) ABSTRACT

An object is to easily ensure the insulation properties of a plurality of coil ends. A multi-phase motor insulating structure is used in a multi-phase motor including a stator unit provided with a stator core and a multi-phase coil. The multi-phase motor insulating structure includes a cover part containing an insulating material. The cover part is configured to cover and hold together a plurality of coil ends of the multi-phase coil that protrudes from an end of the stator core, and defines a positional relationship between the plurality of coil ends.

9 Claims, 11 Drawing Sheets

(58) Field of Classification Search
USPC .......................................................... 310/71
See application file for complete search history.

(56) References Cited

FOREIGN PATENT DOCUMENTS

| | | |
|---|---|---|
| JP | 2011-36093 A | 2/2011 |
| JP | 2018-117469 A | 7/2018 |
| JP | 2019-193360 A | 10/2019 |

* cited by examiner

MULTI-PHASE MOTOR INSULATING STRUCTURE AND MULTI-PHASE MOTOR

CROSS-REFERENCE TO RELATED APPLICATIONS

This application is the U.S. national stage of PCT/JP2022/019378 filed on Apr. 28, 2022, which claims priority of Japanese Patent Application No. JP 2021-078882 filed on May 7, 2021, the contents of which are incorporated herein.

TECHNICAL FIELD

The present disclosure relates to a multi-phase motor insulating structure and a multi-phase motor.

BACKGROUND

A stator for use in a rotating electrical machine as disclosed in JP 2019-193360A includes a stator unit and a segmented coil wound around the stator unit. The segmented coil is configured as a segmented coil with three phases. The segmented coil has coil ends that protrude from a stator core to one side in an axial direction. The coil ends are insulated with powder.

The structure of the stator disclosed in JP 2019-193360A requires a manufacturing process such as applying powder to the coil ends in order to insulate the coil ends. This leads to a need of, e.g., accuracy in manufacturing such as uniformity in the powder application between the coil ends. Accordingly, there is a demand for an insulating structure that can easily ensure the insulation properties of a plurality of coil ends.

It is an object of the present disclosure to realize a technique that can easily ensure the insulation properties of a plurality of coil ends.

SUMMARY

According to an aspect of the present disclosure, a multi-phase motor insulating structure is used in a multi-phase motor including a stator unit provided with a stator core and a multi-phase coil, and the multi-phase motor insulating structure includes a cover part containing an insulating material, the cover part being configured to cover and hold together a plurality of coil ends of the multi-phase coil that protrude from an end of the stator core, and defining a positional relationship between the plurality of coil ends.

According to an aspect of the present disclosure, a multi-phase motor employs the above-described multi-phase motor insulating structure.

Advantageous Effects

The present disclosure can easily ensure the insulation properties of a plurality of coil ends.

DETAILED DESCRIPTION OF PREFERRED EMBODIMENTS

Figure 1:
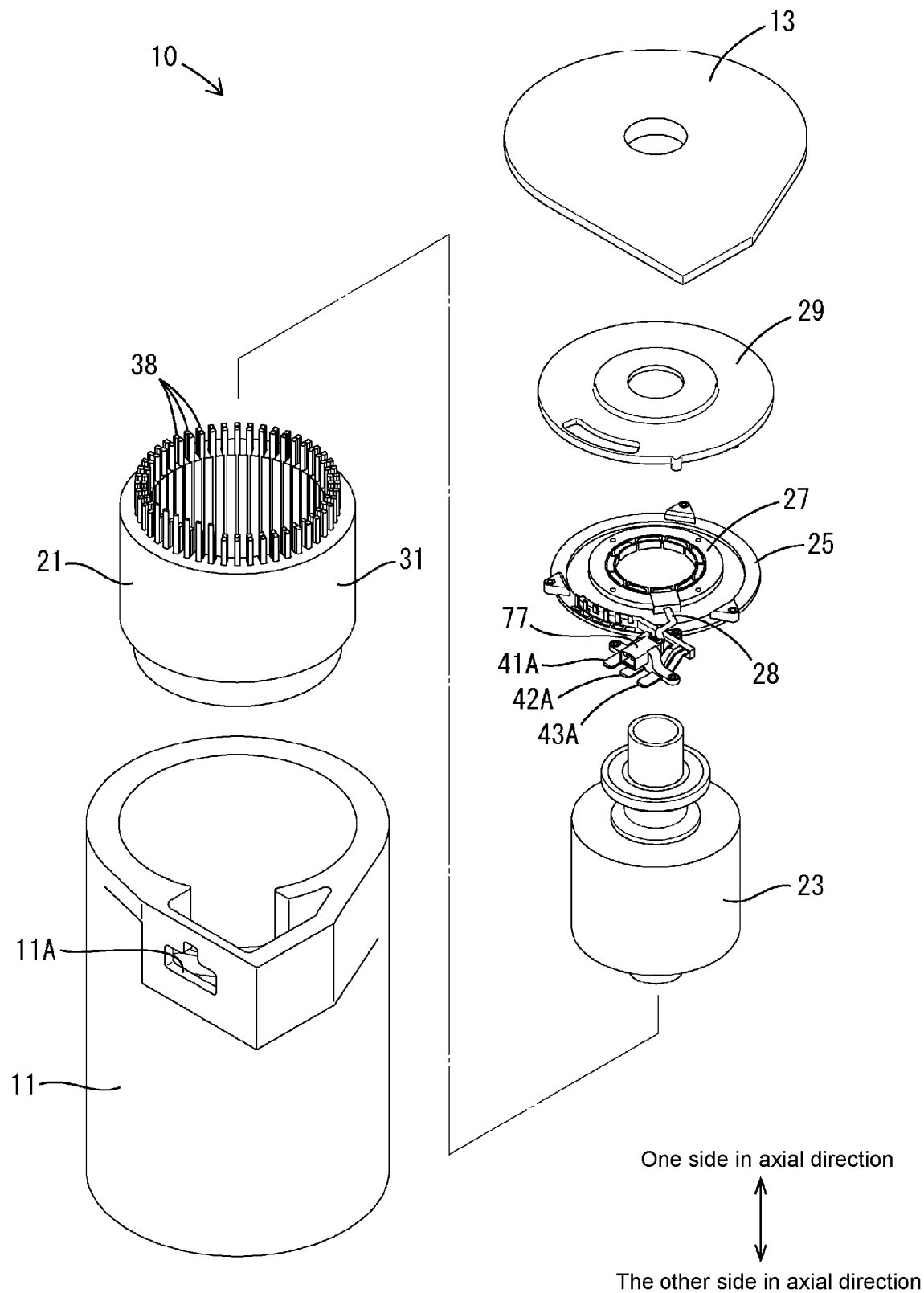
FIG. 1 is an exploded perspective view illustrating a motor according to a first embodiment of the present disclosure.

Hereinafter, embodiments of the present disclosure will be listed and described. Note that the features exemplified below may be combined in a suitable manner as long as they do not contradict each other.

A multi-phase motor insulating structure for use in a multi-phase motor including a stator unit provided with a stator core and a multi-phase coil, the multi-phase motor insulating structure including a cover part containing an insulating material, the cover part being configured to cover and hold together a plurality of coil ends of the multi-phase coil that protrude from an end of the stator core, and defining a positional relationship between the plurality of coil ends.

In this multi-phase motor insulating structure, since the cover part is configured to hold the plurality of coil ends while defining their positional relationship, the cover part can be attached to a bundle of the plurality of coil ends. Also, since the cover part contains an insulating material, and is configured to cover the plurality of coil ends together, it is possible to ensure the insulation properties of the plurality of coil ends. Accordingly, the multi-phase motor insulating structure can easily ensure the insulation properties of the plurality of coil ends, by covering the end of the stator core with the cover part.

In the multi-phase motor insulating structure of the present disclosure, the cover part may be annular and extend along an annular end of the stator core.

With this configuration, it is possible to reliably fix the cover part to the stator unit.

The multi-phase motor insulating structure of the present disclosure may further include: a terminal holding unit containing an insulating material, the terminal holding unit being configured to hold a plurality of power terminals electrically connected to the multi-phase coil. The terminal holding unit may be attached to the cover part.

With this configuration, the multi-phase motor insulating structure may function as a structure for holding the power terminals.

In the multi-phase motor insulating structure of the present disclosure, the terminal holding unit may be connected to an output-side connector of an inverter. The power terminals may be electrically connected to an output terminal of the inverter.

With this configuration, since the terminal holding unit that holds the power terminals is connected to the output-side connector of the inverter, it is possible to eliminate the need of providing a mechanism for holding the power terminals between the multi-phase motor and the inverter.

In the multi-phase motor insulating structure of the present disclosure, conductive parts may be formed in one piece with the cover part, the conductive parts being configured to connect first phase coil parts, connect second-phase coil parts, and connect third phase coil parts in parallel.

With this configuration, the cover part can function to hold the conductive parts, and the conductive parts can be assembled into the multi-phase motor insulating structure.

In the multi-phase motor insulating structure of the present disclosure, the cover part can be attached to and detached from the stator unit.

With this configuration, the coil ends 38 can easily be insulated, compared to a configuration in which an insulating member is welded to the stator unit and is not detachable therefrom.

A multi-phase motor of the present disclosure employs the multi-phase motor insulating structure according to any one of the features above.

According to this configuration, it is possible to realize a multi-phase motor that displays the same effects as any one of the.

First Embodiment

Configuration of Motor

A motor 10 of a first embodiment is a multi-phase motor that uses a multi-phase alternating current source. As shown in FIG. 1, the motor 10 includes a housing 11, an end cover 13, a stator unit 21, a rotor unit 23, a coupling connector 25, a rotation angle sensor 27, and a flange 29. The "multi-phase motor insulating structure" of the present disclosure refers to an insulating structure for use in the motor 10, and is applied to the coupling connector 25 by way of example.

The housing 11 has a shape of a bottomed tube with an opening at an end in the axial direction. The end cover 13 is attached to the housing 11 so as to close the opening of the housing 11. The housing 11 houses the stator unit 21, the rotor unit 23, the coupling connector 25, the rotation angle sensor 27, and the flange 29. The housing 11 has a connection opening 11A from which power terminals 41A, 42A, and 43A and a socket 77 of the later-described coupling connector 25 are exposed. The rotation angle sensor 27 is connected to the coupling connector 25 via a sensor connector 28.

Configuration of Stator Unit

Figure 2:
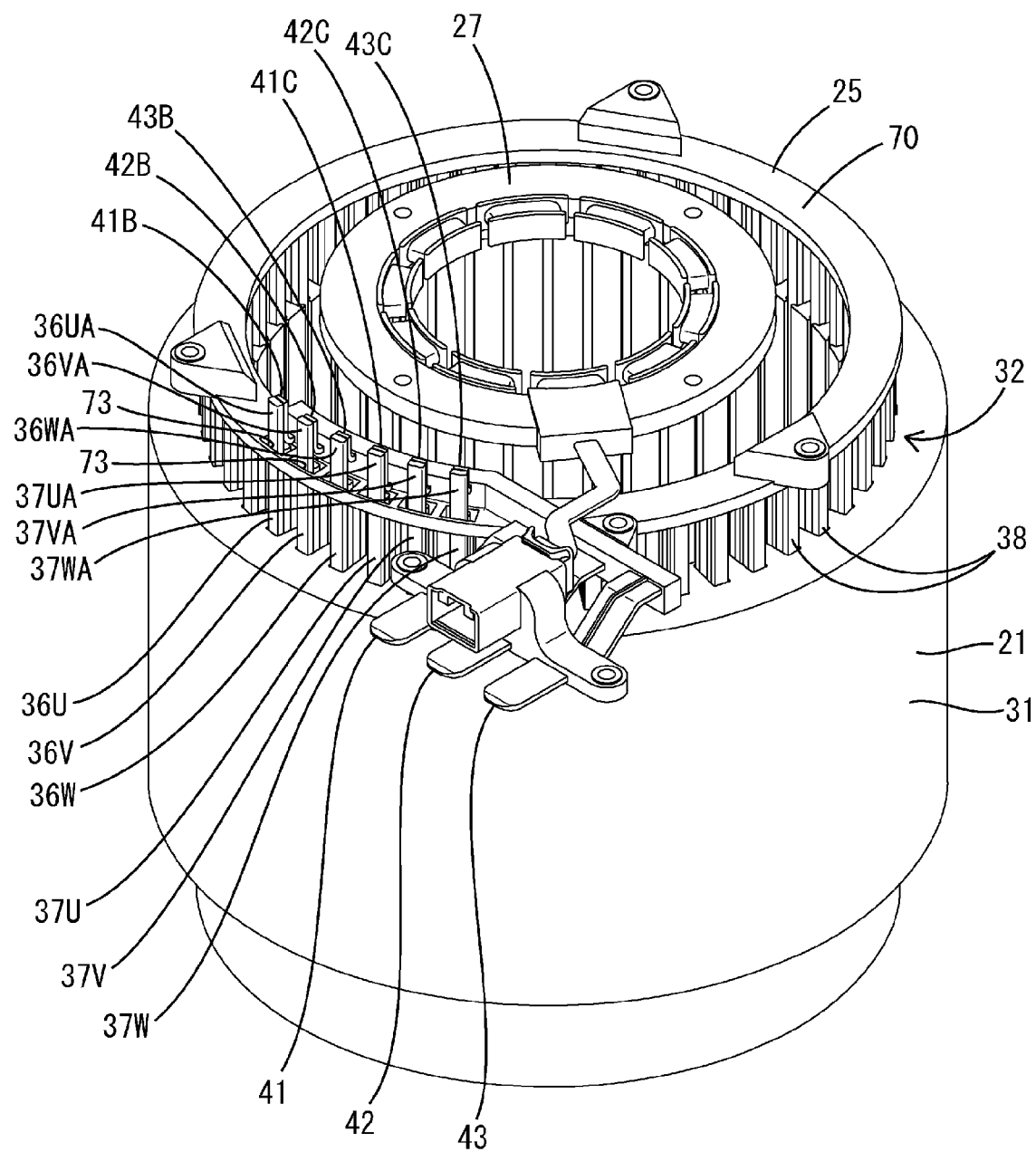
FIG. 2 is a perspective view illustrating a stator unit to which a rotation angle sensor and a coupling connector are attached.

The stator unit 21 is fixed to the inside of the housing 11. The rotor unit 23 is rotatably disposed inside the stator unit 21. As shown in FIG. 2, the coupling connector 25 is attached to the stator unit 21 from one side in the axial direction. Here, as indicated by the arrow in FIG. 1, the side of the motor 10 on which the opening of the housing 11 is formed is defined as "one side in the axial direction", and the side opposite to the "one side in the axial direction" is defined as "the other side in the axial direction". The coupling connector 25 supplies a current supplied from, for example, the inverter to a multi-phase coil 32 of the stator unit 21, the current serving as a driving current. The rotation angle sensor 27 is a so-called resolver, and detects the angle of rotation of the rotor unit 23. The rotation angle sensor 27 is supported by the flange 29 from the one side in the axial direction. The flange 29 covers the coupling connector 25, and supports the rotor unit 23 from the one side in the axial direction so that the rotor unit 23 can rotate.

Figure 3:
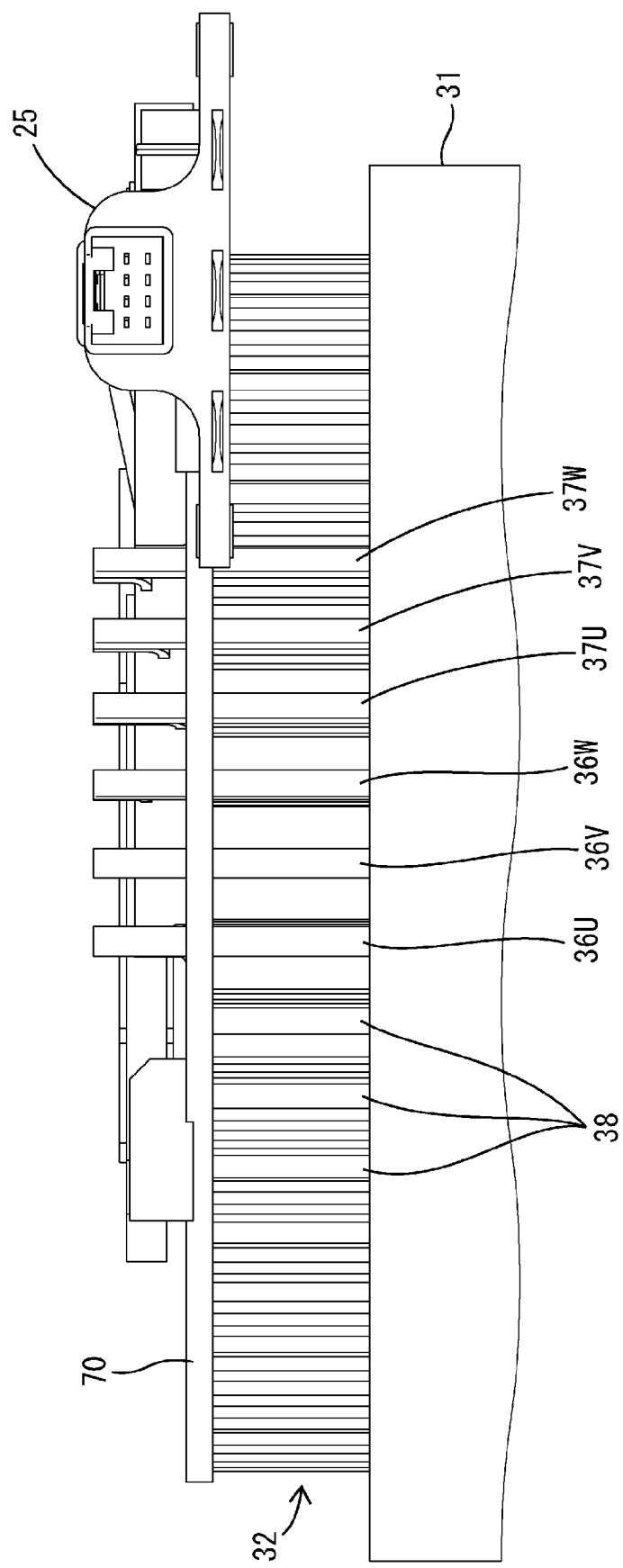
FIG. 3 is a side view illustrating portions of the rotation angle sensor, the coupling connector, and the stator unit shown in FIG. 2.
Figure 4:
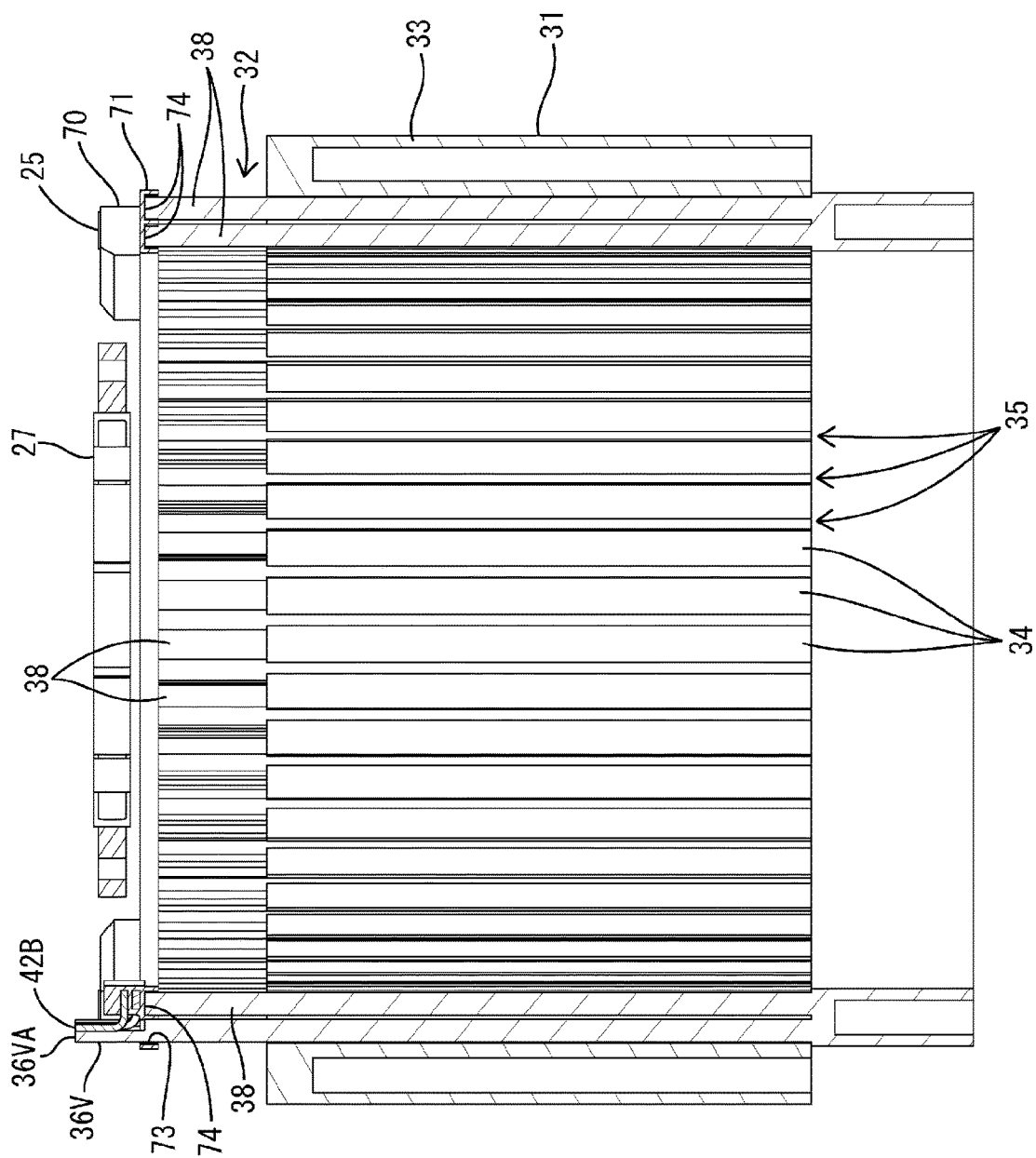
FIG. 4 is a cross-sectional view of the rotation angle sensor, the coupling connector, and the stator unit shown in FIG. 2, viewed from a side.

The stator unit 21 includes, as shown in FIGS. 2 to 4, a stator core 31 and the multi-phase coil 32. The stator core 31 is formed by stacking hollow cylindrical magnetic steel sheets in the axial direction of the stator unit 21. As shown in FIG. 4, the stator core 31 is provided with a yoke 33 and a plurality of teeth 34. The yoke 33 is annular extending in a circumferential direction of the stator unit 21. The teeth 34 protrude inward in a radial direction from the inner circumferential surface of the yoke 33. The plurality of teeth 34 are arranged at intervals from each other in the circumferential direction. A slot 35 is formed between adjacent teeth 34.

The multi-phase coil 32 is configured as a segmented coil with three phases. Note that FIGS. 1 to 4 and 8 show a configuration of the multi-phase coil 32 in a simplified manner. As shown in FIGS. 2 and 3, the multi-phase coil 32 includes first phase (U-phase) coil parts 36U and 37U, second phase (V-phase) coil parts 36V and 37V, and third phase (W-phase) coil parts 36W and 37W. The following will describe the coil parts 36U, 36V, 36W, 37U, 37V, and 37W with reference to the simplified drawings, but the specific configurations of the coil parts 36U, 36V, 36W, 37U, 37V, and 37W are not limited to the configurations below.

The coil parts 36U, 36V, 36W, 37U, 37V, and 37W are respectively fitted to the plurality of teeth 34 while passing through the plurality of slots 35. As shown in FIGS. 2 and 3, the coil parts 36U, 36V, 36W, 37U, 37V, and 37W respectively have ends 36UA, 36VA, 36WA, 37UA, 37VA, and 37WA that protrude from the stator core 31 to one side in the axial direction. As shown in FIG. 2, the respective ends 36UA, 36VA, 36WA, 37UA, 37VA, and 37WA are externally in contact with and electrically connected to later-described conductive parts 41B, 42B, 43B, 41C, 42C, and 43C. Although not shown, the other end of the coil part 36U and the other end of the coil part 37U are electrically connected to each other via a neutral busbar (not shown), the other end of the coil part 36V and the other end of the coil part 37V are electrically connected to each other via a neutral busbar (not shown), and the other end of the coil part 36W and the other end of the coil part 37W are electrically connected to each other via a neutral busbar (not shown). The neutral busbars are electrically connected to each other at neutral points.

As shown in FIGS. 1 to 4, the multi-phase coil 32 includes a plurality of coil ends 38 that protrude from an end of the stator core 31. The plurality of coil ends 38 protrude from the stator core 31 to the one side in the axial direction. The coil ends 38 are constituted by portions of the coil parts 36U, 36V, 36W, 37U, 37V, and 37W that protrude from the stator core 31 to the one side in the axial direction. The plurality of coil ends 38 are lined up next to each other in two lines along the circumferential direction of the stator core 31.

Configuration of Sensor Connector

Figure 5:
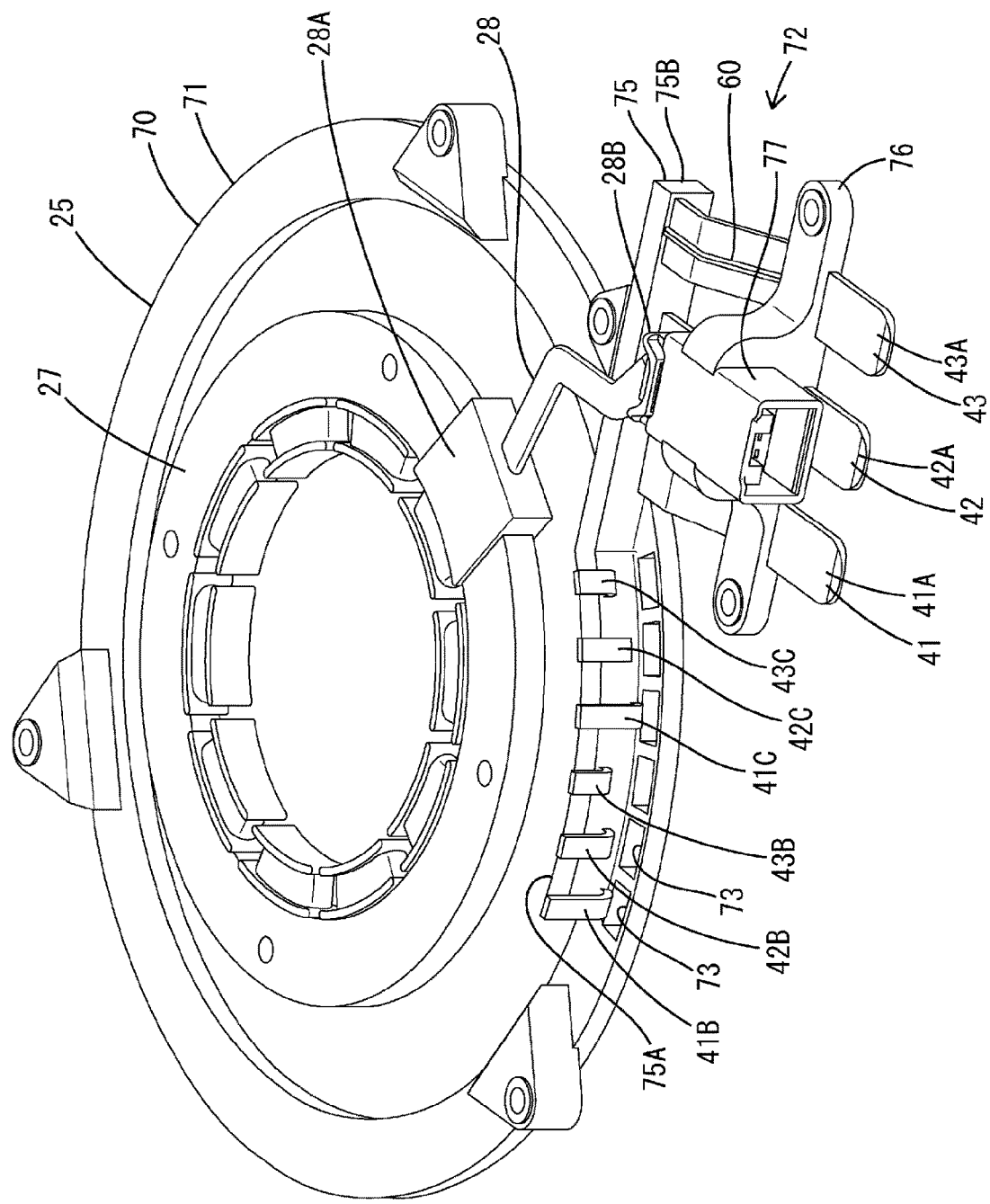
FIG. 5 is a perspective view illustrating the coupling connector, viewed from one side in an axial direction.
Figure 6:
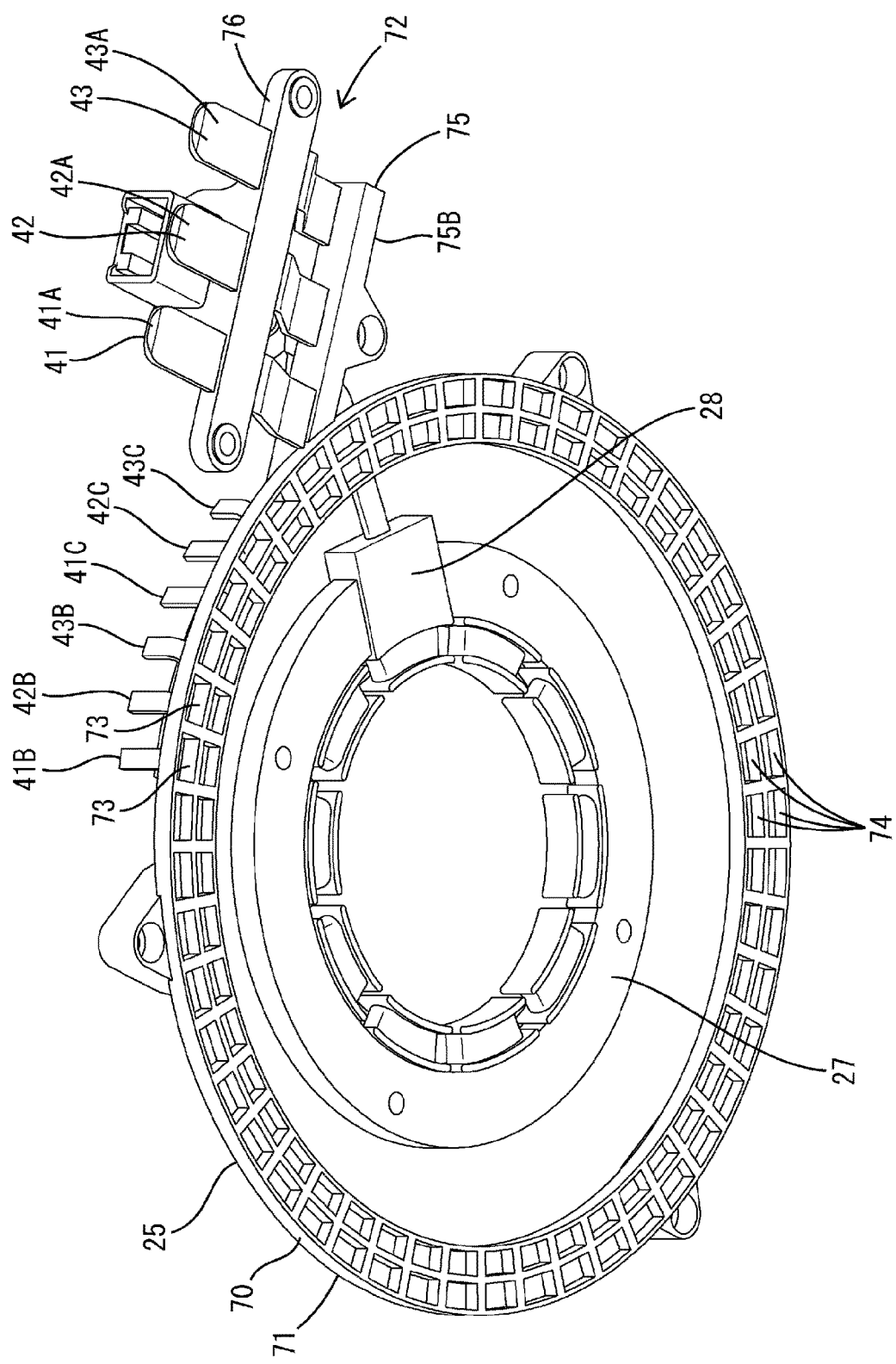
FIG. 6 is a perspective view illustrating the coupling connector, viewed from another side in the axial direction.
Figure 7:
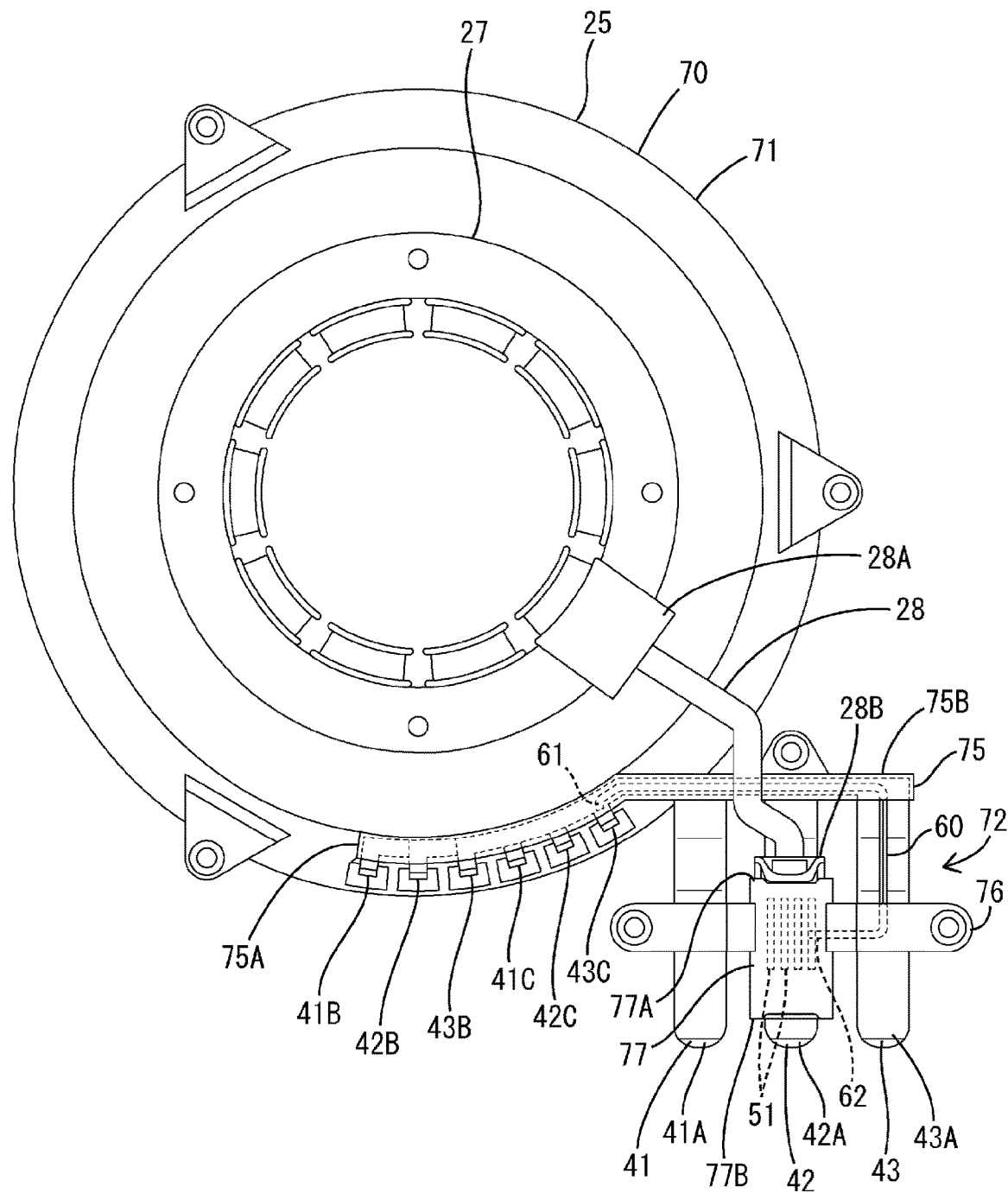
FIG. 7 is a plan view illustrating the coupling connector.

As shown in FIGS. 5 to 9, the sensor connector 28 is provided between the rotation angle sensor 27 and the coupling connector 25. The sensor connector 28 is a connector that outputs a signal detected by the rotation angle sensor 27 to the outside. As shown in FIG. 7, the sensor connector 28 is provided with a signal line (not shown), a sensor-side connection part 28A, and an output-side connection part 28B. The sensor-side connection part 28A is a socket connected to the rotation angle sensor 27. The output-side connection part 28B is attached to an input-side socket part 77A of a later-described holding unit 70. As a result of the output-side connection part 28B being attached to the input-side socket part 77A, the signal line of the sensor connector 28 is connected to a signal terminal 51 (see FIG. 7) of the later-described coupling connector 25.

Configuration of Coupling Connector

As shown in FIGS. 2 to 4, the coupling connector 25 is fixed to the stator unit 21. The coupling connector 25 is connected to the inverter, and supplies a driving current supplied from the inverter to the multi-phase coil 32. As shown in FIGS. 5 to 9, the coupling connector 25 includes three busbars 41, 42, and 43, the signal terminal 51 (see FIG. 7), a thermistor 60, and the holding unit 70.

The busbar 41 is a conductive path interposed between the inverter and the multi-phase coil 32. As shown in FIGS. 5 to 8, the busbar 41 includes a power terminal 41A, and conductive parts 41B and 41C. The power terminal 41A is electrically connected to an output terminal of the inverter. The conductive parts 41B and 41C extend and are branched from the power terminal 41A. The power terminal 41A is electrically connected to the first phase (U-phase) coil parts 36U and 37U via the conductive parts 41B and 41C. The conductive parts 41B and 41C connect the first phase coil parts 36U and 37U to the power terminal 41A in parallel.

The busbar 42 has the same configuration as the busbar 41, and includes, as shown in FIGS. 5 to 8, a power terminal 42A and conductive parts 42B and 42C. The conductive parts 42B and 42C are parts that connect the second phase coil parts 36V and 37V to the busbar 42 in parallel. The power terminal 42A is electrically connected to the coil parts 36V and 37V via the conductive parts 42B and 42C.

The busbar 43 has the same configuration as the busbar 41, and includes, as shown in FIGS. 5 to 8, a power terminal 43A and conductive parts 43B and 43C. The power terminal 43A is electrically connected to the output terminal of the inverter when the coupling connector 25 is connected to an output-side connector of the inverter. The conductive parts 43B and 43C are parts that connect the third phase coil parts 36W and 37W to the busbar 43 in parallel. The power terminal 43A is electrically connected to the coil parts 36W and 37W via the conductive parts 43B and 43C.

The signal terminal 51 is a terminal that transmits a signal from the rotation angle sensor 27. The signal terminal 51 is disclosed in FIG. 7 by way of example, but the present disclosure is not limited to the shown configuration. The signal terminal 51 is held by the later-described holding unit 70 (terminal holding unit 72). One end of the signal terminal 51 is connected to a signal line (not shown) of the sensor connector 28. The other end of the signal terminal 51 is connected to a terminal of an external socket, for example.

The thermistor 60 detects the temperature of the multi-phase coil 32. As shown in FIG. 7, one end 61 of a lead of the thermistor 60 is in contact with the conductive part 43C of the third phase (W-phase). The other end 62 of the lead of the thermistor 60 is disposed inside the socket 77 of the sensor connector 28.

As shown in FIGS. 5 to 9, the holding unit 70 holds the three busbars 41, 42, and 43, the signal terminal 51, and the thermistor 60 as one piece. More specifically, as shown in FIG. 5, the holding unit 70 holds the power terminals 41A, 42A, and 43A, the signal terminal 51, and the thermistor 60 as one piece. With this, the configurations of the coupling connector 25 holding the power terminals 41A, 42A, and 43A, the signal terminal 51, and the thermistor 60 can be simplified. The holding unit 70 contains an insulating material. For example, the holding unit 70 may be made only of an insulating material. The holding unit 70 is made by molding using a resin material, for example.

As shown in FIGS. 5 to 9, the holding unit 70 includes a cover part 71 and a terminal holding unit 72. As shown in FIG. 5, the cover part 71 is plate-shaped and ring-shaped with its thickness extends in the axial direction. The cover part 71 contains an insulating material. For example, the cover part 71 may be made only of an insulating material. The annular cover part 71 is fixed to the annular end of the stator unit 21 (the plurality of coil ends 38). The cover part 71 covers and holds the plurality of coil ends 38 of the multi-phase coil 32 together, while defining the positional relationship of the plurality of coil ends 38. The cover part 71 can be attached to and detached from the stator unit 21 (the plurality of coil ends 38).

The cover part 71 is provided with six holes 73 as shown in FIG. 5, and a plurality of recesses 74 shown in FIG. 6. The six holes 73 are lined up next to each other along the circumferential direction as shown in FIG. 5. The holes 73 pass through the cover part 71 in the axial direction. As shown in FIG. 2, the ends of the conductive parts 41B, 41C, 42B, 42C, 43B, and 43C of the multi-phase coil 32 are respectively inserted into the six holes 73. As shown in FIG. 6, the recesses 74 are formed in the cover part 71 on the other side in the axial direction. The recesses 74 are recessed towards the one side in the axial direction. The plurality of recesses 74 are lined up next to each other in two lines along the circumferential direction. A plurality of outer recesses 74 and the six hole 73 are lined up next to each other in the circumferential direction in a ring shape. As shown in FIG. 4, the recesses 74 cover the coil ends 38. Note that in FIG. 4, it appears as if only some of the coil ends 38 are covered by the recesses 74, but the remaining coil ends 38 are also covered by the recesses 74. When the coil ends 38 are fitted into the recesses 74, the recesses 74 are fixed to the coil ends 38. By fitting the coil ends 38 into the recesses 74, the cover part 71 is attached to the stator unit 21. By removing the coil ends 38 from the recesses 74, the cover part 71 is detached from the stator unit 21.

As shown in FIGS. 5 to 7, the terminal holding unit 72 is attached to the cover part 71. The terminal holding unit 72 contains an insulating material. For example, the terminal holding unit 72 may be made only of an insulating material. The terminal holding unit 72 belongs to the cover part 71. The terminal holding unit 72 includes, as shown in FIGS. 5 to 7, a protruding portion 75 and a fixation portion 76. The protruding portion 75 is provided in one piece with the cover part 71. The protruding portion 75 includes a base 75A and a protrusion 75B. The base 75A stands upright from the cover part 71 to the one side in the axial direction. The base 75A is provided at a position of the cover part 71 inward of the six holes 73, as shown in FIGS. 5 and 7. The protrusion 75B protrudes from one end in the circumferential direction of the base 75A outward (opposite to the axis of the cover part 71). The fixation portion 76 covers portions (central portions in the longitudinal direction) of the power terminals 41A, 42A, and 43A to fix the power terminals 41A, 42A, and 43A. As shown in FIG. 7, the socket 77 is provided on the fixation portion 76. The socket 77 includes the input-side socket part 77A, and the output-side socket part 77B. The output-side connection part 28B of the sensor connector 28 is connected to the input-side socket part 77A. An external socket is connected to the output-side socket part 77B. For example, the terminal holding unit 72 (specifically, the output-side socket part 77B) is connected to the output-side connector of the inverter. The power terminals 41A, 42A, and 43A are electrically connected to the output terminal of the inverter. The signal terminal 51 is formed in one piece with the socket 77, and is held by the socket 77.

Figure 8:
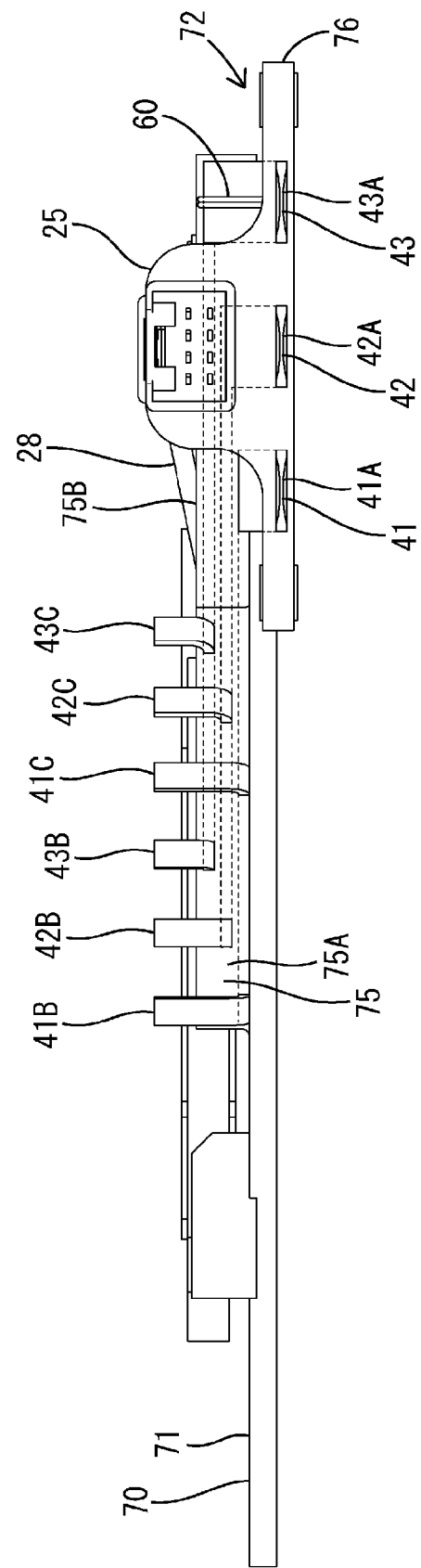
FIG. 8 is a side view illustrating the coupling connector.
Figure 9:
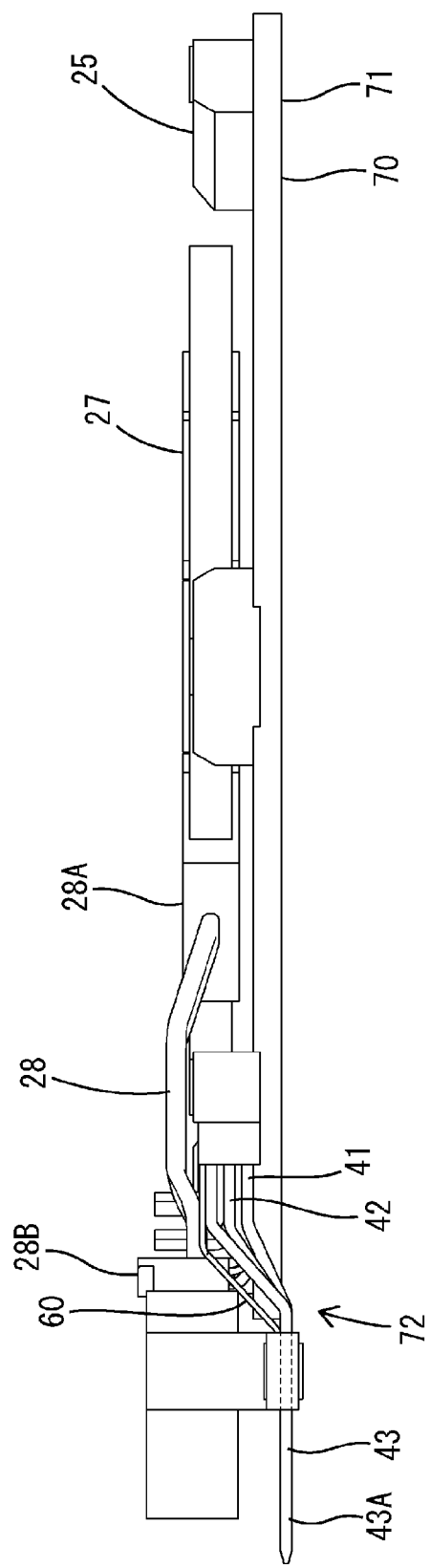
FIG. 9 is a side view illustrating the coupling connector, viewed from a direction different from in FIG. 8.

As shown in FIGS. 5 to 9, the terminal holding unit 72 covers the three busbars 41, 42, and 43. As shown in FIG. 8, the busbars 41, 42, and 43 are lined up in the stated order from the other side to one side in the axial direction. The base 75A holds, as shown in FIGS. 7 and 8, the conductive parts 41B, 41C, 42B, 42C, 43B, and 43C together. That is to say, the conductive parts 41B, 41C, 42B, 42C, 43B, and 43C are formed in one piece with the cover part 71 (specifically, the base 75A). Ends of the conductive parts 41B, 41C, 42B, 42C, 43B, and 43C on one side (that are connected to the coil parts 36U, 37U, 36V, 37V, 36W, and 37W) are exposed from the outer circumferential surface of the base 75A, and are bent to the one side in the axial direction. As shown in FIGS. 5 to 7, the power terminals 41A, 42A, and 43A are exposed from the protrusion 75B. The power terminals 41A, 42A, and 43A protrude in a direction orthogonal to the direction in which the protrusion 75B extends. The direction in which the external socket is connected to the output-side socket part 77B matches the direction in which the power terminals 41A, 42A, and 43A protrude.

As shown in FIG. 5, the power terminals 41A, 42A, and 43A, the signal terminal 51, and the thermistor 60 are held while being formed in one piece with the terminal holding unit 72. Specifically, the power terminals 41A, 42A, and 43A are formed in one piece with the protruding portion 75 and the fixation portion 76. As shown in FIG. 7, the signal terminal 51 is formed in one piece with the fixation portion 76 (socket 77). The lead of the thermistor 60 on one end 61 side is covered by the protruding portion 75, as shown in FIG. 7. The lead of the thermistor 60 on the other end 62 side is covered by the fixation portion 76. The other end 62 of the lead of the thermistor 60 is disposed inside the socket 77.

Motor Assembling Process

Figure 10A:
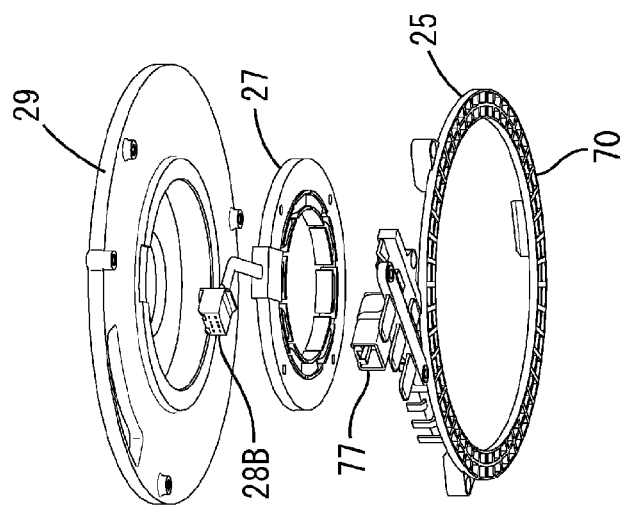
FIGS. 10A-10C illustrate a flow of a motor assembling process.
Figure 10B:
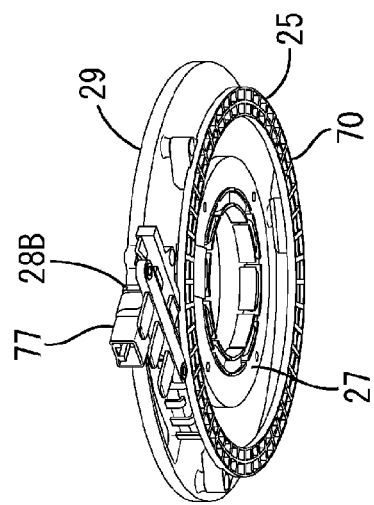

The following will describe a process of assembling the motor 10. First, as shown in FIG. 10(A), the coupling connector 25, the rotation angle sensor 27, and the flange 29 are prepared. Then, as shown in FIG. 10(B), the rotation angle sensor 27 and the flange 29 are attached to the coupling connector 25. Specifically, the output-side connection part 28B of the sensor connector 28 is connected to the input-side socket part 77A of the coupling connector 25. Furthermore, the flange 29 is attached to the coupling connector 25 from one side in the axial direction.

Figure 10C:
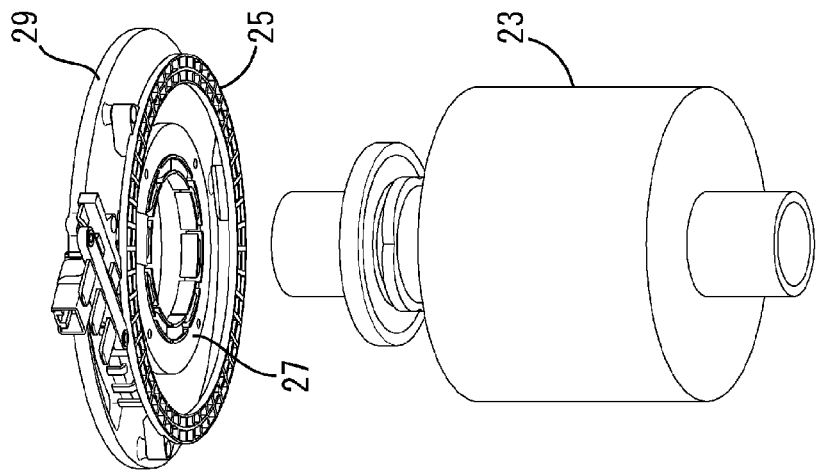
Figure 11B:
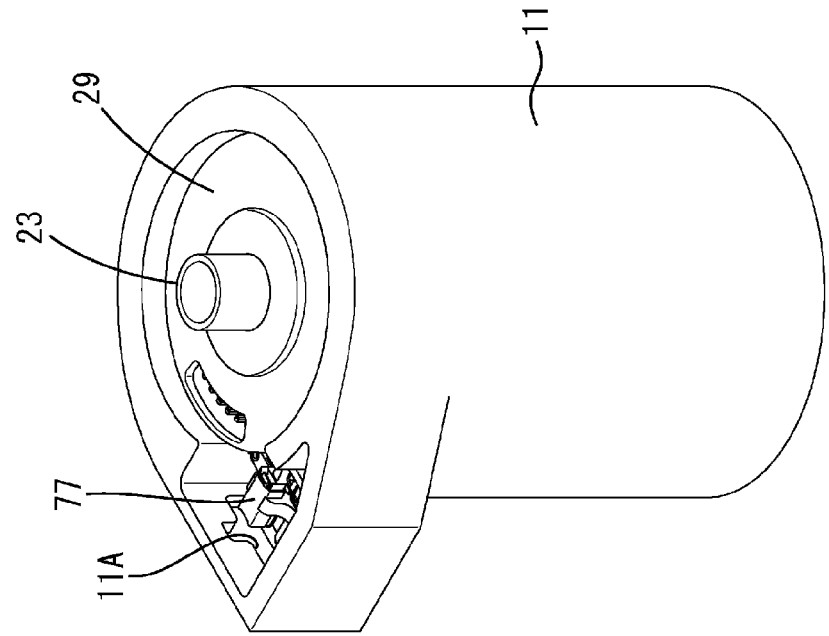
FIGS. 11A-11B illustrate a flow of the motor assembling process, following the process of FIGS. 10A-10C.
Figure 11A:
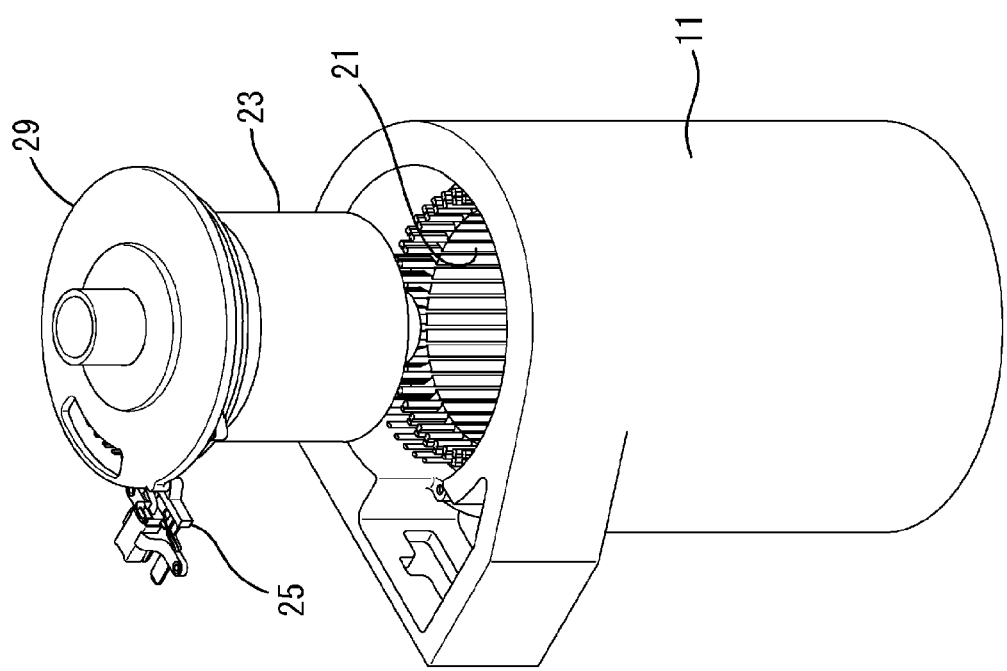

Then, as shown in FIG. 10(C), the rotor unit 23 is attached to the coupling connector 25 to which the rotation angle sensor 27 and the flange 29 have been attached. Then, as shown in FIGS. 11(A) and 11(B), the assembly including the rotor unit 23, the coupling connector 25, the rotation angle sensor 27, and the flange 29 is attached to the housing 11. Specifically, by fitting the coil ends 38 into the recesses 74 (see FIG. 4 and the like), the cover part 71 is attached to the stator unit 21. Then, the end cover 13 is attached to the housing 11 so as to close the opening of the housing 11. With this, the motor 10 is complete.

Examples of Effects

The following will describe some effects of the first embodiment.

In the multi-phase motor insulating structure of the present disclosure, since the cover part 71 is configured to hold the plurality of coil ends 38 while defining their positional relationship, the cover part 71 can be attached en bloc to several of the plurality of coil ends 38. Also, since the cover part 71 contains an insulating material, and is configured to cover the plurality of coil ends 38 together, it is possible to ensure the insulation properties of the plurality of coil ends 38. Accordingly, the multi-phase motor insulating structure can easily ensure the insulation properties of the plurality of coil ends 38, by covering the end of the stator core 31 with the cover part 71.

In the multi-phase motor insulating structure of the present disclosure, the cover part 71 is annular and extends along the annular end of the stator core 31. With this, it is possible to reliably fix the cover part 71 to the stator unit 21.

The multi-phase motor insulating structure of the present disclosure includes the terminal holding unit 72 containing an insulating material, the terminal holding unit 72 being configured to hold the plurality of power terminals 41A, 42A, and 43A electrically connected to the multi-phase coil 32. With this, the multi-phase motor insulating structure may function as a structure for holding the power terminals 41A, 42A, and 43A.

In the multi-phase motor insulating structure of the present disclosure, the terminal holding unit 72 is connected to the output-side connector of the inverter. The power terminals 41A, 42A, and 43A are electrically connected to the output terminal of the inverter. With this, since the terminal holding unit 72 that holds the power terminals 41A, 42A, and 43A is connected to the output-side connector of the inverter, it is possible to eliminate the need of providing a mechanism for holding the power terminals 41A, 42A, and 43A between the motor 10 and the inverter.

In the multi-phase motor insulating structure of the present disclosure, the conductive parts 41B, 41C, 42B, 42C, 43B, and 43C are formed in one piece with the cover part 71, the conductive parts 41B, 41C, 42B, 42C, 43B, and 43C being configured to connect the first-phase coil parts 36U and 37U, connect the second-phase coil parts 36V and 37V, and connect the third-phase coil parts 36W and 37W in parallel. With this, the cover part 71 can function to hold the conductive parts 41B, 41C, 42B, 42C, 43B, and 43C, and the conductive parts 41B, 41C, 42B, 42C, 43B, and 43C can be assembled into the multi-phase motor insulating structure.

In the multi-phase motor insulating structure of the present disclosure, the cover part 71 can be attached to and detached from the stator core 21. With this, the coil ends 38 can easily be insulated, compared to a configuration in which an insulating member is welded to the stator unit 21 and is not detachable therefrom.

Other Embodiments

The present disclosure is not limited to the embodiments described with reference to the specification given above and the drawings. For example, any combination of features of the above-described or later-described embodiments is possible to the extent that they are not inconsistent with each other. Also, any feature of the above-described or later-described embodiments can be omitted as long as it is not explicitly defined as being essential. Furthermore, the above-described embodiments may be modified as follows.

In the first embodiment, a configuration has been exemplified in which the cover part 71 covers all of the coil ends 38 together, but a configuration is also possible in which the cover part 71 covers only some but not all of the coil ends 38.

In the first Embodiment, the cover part 71 has a ring-shape, but the cover part 71 may have another shape such as a square ring shape.

In the first embodiment, the holding unit 70 includes the terminal holding unit 72, but the terminal holding unit 72 is not essential. For example, the holding unit 70 may also be constituted only by the cover part 71.

In the first embodiment, a configuration has been given in which two U-phase coil parts, two V-phase coil parts, and two W-phase coil parts are provided, but the number of the coil parts is not limited to two.

In the first embodiment, the protruding portion 75 and the fixation portion 76 of the holding unit 70 are separate portions, but a configuration is also possible in which they are molded as one piece and are inseparable.

In the first embodiment, the signal terminal 51 held by the socket 77 is given as an example of a signal terminal held by the holding unit 70, but a terminal (an end of a signal line of the sensor connector 28) held by the output-side connection part 28B of the sensor connector 28 may also be included.

In the first embodiment, the one end 61 of the lead of the thermistor 60 is in contact with the conductive part 43C of the third phase (W-phase), but a configuration is also possible in which the one end 61 is in contact with another conductive part.

The invention claimed is:

1. A multi-phase motor insulating structure for use in a multi-phase motor comprising a stator unit provided with a stator core and a multi-phase coil, the multi-phase motor insulating structure comprising:
    a cover part configured to cover together a plurality of coil ends of the multi-phase coil that protrude from an end of the stator core,
    wherein the cover part contains an insulating material, and is configured to hold the plurality of coil ends while defining a positional relationship between the plurality of coil ends,
    a plurality of conductive parts configured to connect coil parts of multiple phases in parallel are formed in one piece with the cover part,
    the cover part is annular and extends along an annular end of the stator core,
    the cover part is provided with a plurality of holes passing through the cover part in an axial direction, the plurality of holes being lined up next to each other along a circumferential direction,
    the coil parts of multiple phases respectively have ends on one side that are configured to be inserted into the plurality of holes and protrude to one side in the axial direction,
    the cover part includes a base standing upright from the cover part to the one side in the axial direction,
    the base holds the plurality of conductive parts together, with the conductive parts exposed from an outer circumferential side of the base, and
    the ends of the coil parts of multiple phases on the one side are configured to externally come into contact with and to be electrically connected to portions of the plurality of conductive parts that are exposed from the base.

2. The multi-phase motor insulating structure according to claim 1, further comprising:
    a terminal holding unit containing an insulating material, the terminal holding unit being configured to hold a plurality of power terminals electrically connected to the multi-phase coil,
    wherein the terminal holding unit is attached to the cover part.

3. The multi-phase motor insulating structure according to claim 2,
    wherein the terminal holding unit is connected to an output-side connector of an inverter, and
    the power terminals are electrically connected to an output terminal of the inverter.

4. The multi-phase motor insulating structure according to claim 2, wherein conductive parts are formed in one piece with the cover part, the conductive parts being configured to connect first-phase coil parts, connect second-phase coil parts, and connect third-phase coil parts in parallel.

5. The multi-phase motor insulating structure according to claim 2, wherein the cover part can be attached to and detached from the stator unit.

6. A multi-phase motor that employs the multi-phase motor insulating structure according to claim 2.

7. The multi-phase motor insulating structure according to claim 1, wherein conductive parts are formed in one piece with the cover part, the conductive parts being configured to connect first-phase coil parts, connect second-phase coil parts, and connect third-phase coil parts in parallel.

8. The multi-phase motor insulating structure according to claim 1, wherein the cover part can be attached to and detached from the stator unit.

9. A multi-phase motor that employs the multi-phase motor insulating structure according to claim 1.

\* \* \* \* \*